(12) United States Patent
Kreindl et al.

(10) Patent No.: US 8,777,629 B2
(45) Date of Patent: Jul. 15, 2014

(54) DEVICE AND METHOD FOR SIMULATING A WELDING PROCESS

(75) Inventors: Josef Kreindl, Buchkirchen (AT); Stefan Glanseck, Marchtrenk (AT)

(73) Assignee: Fronius International GmbH, Pettenbach (AT)

( * ) Notice: Subject to any disclaimer, the term of this patent is extended or adjusted under 35 U.S.C. 154(b) by 749 days.

(21) Appl. No.: 12/737,313

(22) PCT Filed: Jun. 3, 2009

(86) PCT No.: PCT/AT2009/000225
§ 371 (c)(1),
(2), (4) Date: Dec. 29, 2010

(87) PCT Pub. No.: WO2010/000003
PCT Pub. Date: Jan. 7, 2010

(65) Prior Publication Data
US 2011/0091846 A1    Apr. 21, 2011

(30) Foreign Application Priority Data

Jul. 4, 2008    (AT) ................................ A 1062/2008

(51) Int. Cl.
*G09B 25/02*    (2006.01)
(52) U.S. Cl.
CPC ...................................... *G09B 25/02* (2013.01)
USPC ............................................ 434/234; 703/6
(58) Field of Classification Search
USPC ................. 219/125.1, 130.1, 124.34, 121.46, 219/121.54, 137.61, 130.21, 137 R, 137.44; 700/248; 361/679.55; 345/156, 161; 463/32; 702/150; 359/557; 382/103; 434/234
See application file for complete search history.

(56) References Cited

U.S. PATENT DOCUMENTS 4,124,944 A    11/1978 Blair
4,629,860 A  * 12/1986 Lindbom .................... 219/125.1

(Continued)

FOREIGN PATENT DOCUMENTS

| ES | 2 274 736 | 5/2007 |
| FR | 1 456 780 | 7/1966 |
| GB | 2 435 838 | 9/2007 |
| WO | WO 2006/034571 | 4/2006 |

OTHER PUBLICATIONS

Austrian Office Action dated Mar. 16, 2009 with English translation of relevant parts.

(Continued)

*Primary Examiner* — Robert J Utama
*Assistant Examiner* — Randall N Crenwelge
(74) *Attorney, Agent, or Firm* — Collard & Roe, P.C.

(57) ABSTRACT

The invention relates to a device (1) and a method for simulating a welding process. The device comprises a computer (2) having an input device (11) and an output device (6), a welding torch (3), a magnetic position monitoring device having at least one transmitter and a plurality of sensors, a retaining device (15) for a workpiece (4) used for the simulation and a visualization device (16) for generating a two- or three-dimensional image on the output device (6). The retaining device (15) has a recess into which the workpiece (4) can be inserted, at least one transmitter of the position monitoring device being arranged below the recess at as small a distance from the workpiece as possible, and the retaining device (15) being designed as a small, portable box to be placed on a table (10).

22 Claims, 14 Drawing Sheets

(56) References Cited

U.S. PATENT DOCUMENTS

| | | | |
|---|---|---|---|
| 4,689,021 A | | 8/1987 | Vasiliev et al. |
| 4,931,018 A | | 6/1990 | Herbst et al. |
| 4,998,050 A | * | 3/1991 | Nishiyama et al. ........... 700/248 |
| 5,061,841 A | * | 10/1991 | Richardson ............... 219/130.01 |
| 5,305,183 A | * | 4/1994 | Teynor ..................... 361/679.55 |
| 5,436,638 A | * | 7/1995 | Bolas et al. .................... 345/156 |
| 5,562,843 A | * | 10/1996 | Yasumoto ................ 219/124.34 |
| 5,728,991 A | * | 3/1998 | Takada et al. ............ 219/121.46 |
| 6,236,013 B1 | * | 5/2001 | Delzenne .................. 219/121.54 |
| 6,331,848 B1 | | 12/2001 | Stove et al. |
| 6,572,379 B1 | | 6/2003 | Sears et al. |
| 7,381,923 B2 | * | 6/2008 | Gordon et al. ........... 219/137.61 |
| 7,970,172 B1 | * | 6/2011 | Hendrickson ................ 382/103 |
| 2003/0023592 A1 | | 1/2003 | Modica et al. |
| 2003/0025884 A1 | | 2/2003 | Hamana et al. |
| 2003/0234885 A1 | | 12/2003 | Pilu |
| 2005/0128186 A1 | * | 6/2005 | Shahoian et al. ............. 345/161 |
| 2005/0159840 A1 | * | 7/2005 | Lin et al. ....................... 700/245 |
| 2005/0199602 A1 | * | 9/2005 | Kaddani et al. .......... 219/130.21 |
| 2006/0214924 A1 | | 9/2006 | Kawamoto et al. |
| 2006/0226137 A1 | * | 10/2006 | Huismann et al. ....... 219/137.71 |
| 2008/0314887 A1 | * | 12/2008 | Stoger et al. ............... 219/137 R |
| 2009/0045183 A1 | * | 2/2009 | Artelsmair et al. ...... 219/137.44 |
| 2009/0325699 A1 | * | 12/2009 | Delgiannidis .................. 463/32 |
| 2010/0299101 A1 | * | 11/2010 | Shimada et al. .............. 702/150 |
| 2011/0122495 A1 | * | 5/2011 | Togashi ....................... 359/557 |

OTHER PUBLICATIONS

VRSim, Inc., "Sim Welder GMAW Hardware Specs" Internet Article, [Online] May 2007, XP002545702, Retrieved from the Internet on Sep. 14, 2009, pp. 1-3 and pp. 1-6. URL: http://www.simwelder.com (ISR).

Chuansong Wu: "Microcomputer-based welder training simulator," Computers in Industry, vol. 20, No. 3, Oct. 1992, pp. 321-325, XP000305597, Elsevier Science Publishers, Amsterdam, NL. (ISR).

* cited by examiner

DEVICE AND METHOD FOR SIMULATING A WELDING PROCESS

CROSS REFERENCE TO RELATED APPLICATIONS

This application is the National Stage of PCT/AT2009/000225 filed on Jun. 3, 2009, which claims priority under 35 U.S.C. §119 of Austrian Application No. A 1062/2008 filed on Jul. 4, 2008, the disclosure of which is incorporated by reference. The international application under PCT article 21(2) was not published in English.

The invention relates to a device for simulating a welding process, comprising a computer having an input device and an output device, a welding torch, a magnetic position monitoring device having at least one transmitter and a plurality of sensors, a retaining device for a workpiece used for the simulation, and a visualization device for generating a two- or three-dimensional image on the output device.

Furthermore, the invention relates to methods for performing the simulation of a welding process as described herein.

Various visual welding systems are already known. For example on www.simwelder.com a visual welding system is shown which is formed of a base element, a welding stand and a workpiece element. In the base element the computing unit for calculating the welding process and a monitor for displaying the welding process are arranged. Furthermore, to the base element a welding torch is connected via a hose pack assembly, by means of which a visual welding on a workpiece placed in the welding stand and used for simulation can be performed non-contactly. For this, the welding stand has a receiving device in the form of an u-shaped frame comprising a fastening device, into which various sliding elements having workpieces used for simulation attached thereto can be inserted in. Thus, the sliding elements containing the various workpieces can always be fastened in the same position on the welding stand by the fastening device. Position determination of the welding torch in relation to the workpiece is done via a magnetic position monitoring system, particularly by a position/orientation tracker, such as a POLHEMUS tracker available from Polhemus Incorporated (Colchester, Vt.).

A significant disadvantage in this visual welding system is that it requires a lot of space. When said visual welding system is assembled, an exact calibration of both elements, particularly base element and welding stand, to each other has to be performed at first after positioning of the individual systems, wherein afterwards both elements, particularly base element and welding stand, may not be displaced, because otherwise a new calibration has to be performed.

A further disadvantage is that in this known system only VR (virtual reality) goggles can be used. Given that not all people are able to wear VR goggles for different reasons (defective vision, wearer of glasses), certain users will be excluded by a system focussing on visualization by VR goggles only.

The object of the invention is to provide a device and a method for simulating a welding process, by which the process can be simulated realistically and operated as simple as possible. Disadvantages of known devices and methods should be avoided or reduced.

The object of the invention is solved by a device mentioned above, in which the retaining device has a recess into which the workpiece can be inserted, wherein at least one transmitter of the position monitoring device being arranged below the recess at as small a distance from the workpiece as possible, and the retaining device being designed as a small, portable box to be placed on a table. With the closest positioning of the transmitter related to the workpiece as possible the interfering influences can be kept small. Advantageously, in the simulated welding process the sensor within the welding torch is brought very close to the transmitter being arranged below the workpiece, whereby a preferably small distance is achieved and thus an ideal evaluation is ensured. Thus, a maximum insensitiveness against interference influences for magnetic tracking systems is ensured. Due to the very compact design all components can be packed for example into a case, and thus the entire system can be transported easily. Due to its compact design the system can also be assembled on a normal table, requiring relatively small space.

When the box and the workpiece are made from an electrically and magnetically non-conductive material, particularly a synthetic material, a commercially available magnetic position monitoring system can be employed and interference influences can be kept small.

When at least one transmitter is arranged in a central position of the retaining device below the workpiece, so that in a simulated welding process the distance between the at least one transmitter and one sensor within the welding torch can be minimized, a highly accurate position determination is enabled and external interference influences have no large impacts.

Advantageously, the box containing the workpiece is designed for the simulation of both a horizontal and a vertical welding, whereby nearly all welding positions can be practiced on this system by a user without producing scrap unnecessarily. For this purpose the user only needs to turn the box to carry out both horizontal and vertical weldings.

By providing the workpiece and the box with an automatic recognition means, particularly a RFID chip and a RFID reader, an automatic recognition of the used workpiece and a corresponding setting on the computer is automatically enabled. Thus, the user-friendliness of the system is increased significantly and error sources can be minimized.

When certain marked sections for an input via the welding torch are arranged on the box, and said sections are for example configured as a confirmation button, repetition button, menu button, reverse button, with appropriate positioning and activation of the welding torch the respective command can be executed on the computer. Hence, there is no need for the user to put the welding torch always down for controlling the system, increasing the usability significantly.

Advantageously, the welding torch comprises a torch handle and a pipe bend and has a line connection to the computer. Thus, the user can perform the simulations by means of a commercially available welding torch as used in a real welding system.

When a sensor for position determination is arranged within the pipe bend, particularly in the section of a torch tip, the distance between the transmitter on the box and the sensor within the welding torch can be kept as small as possible and a highly accurate position determination can be enabled.

It is advantageous to have a design, in which a movably supported pin for simulating a welding wire is arranged on the welding torch, particularly on tip of the torch. By said movable support it is achieved that the pin is pushed back into the welding torch when contacting the workpiece and there is no fix distance to the torch.

When a start switch for activating the simulation of the welding process is arranged on the torch handle, the user has to start the simulated welding process like in a real welding process via said start switch.

When additional switching elements for adjusting the given welding parameters, such as wire feed, voltage, power, are arranged on the torch handle, a welding process close to reality can be simulated and the user may change appropriate parameters via the welding torch during simulation.

A design, in which a visualization device, particularly a welding shield, is connected to the position monitoring device and/or the computer, on which a sensor is arranged, is advantageous in that usual VR goggles, which are not suited for each user, need not to be used.

It is also advantageous to have a design, in which the control of the camera for visualizing the scene on a display device, particularly a monitor, is done via the visualization device, as this enables the use of a typical welding shield or a cap, increasing the wearing comfort. An adjustment to weak eyesight of the user is not necessary.

It is advantageous to have a design, in which an electromagnetic position sensor, such as a POLHEMUS sensor available from Polhemus Incorporated (Colchester, Vt.) is arranged on the welding helmet or on the cap and an electromagnetic transmitter, such as a POLHEMUS transmitter available from Polhemus Incorporated (Colchester, Vt.) is arranged within the workpiece, through which the position of the camera can be determined. This way a simple possibility to perform a simulated welding process without 3D goggles is provided.

Advantageously, a portable case for housing all components of the device is provided. This way, high flexibility is achieved.

The object of the invention is also solved by a method, in which the visualization device is designed in the form of a welding shield or a cap and a sensor of the position monitoring device is arranged on the visualization device and the visualization device is used as a camera having a special damping for movement, wherein at the beginning of the welding simulation a target point of the visualization device is positioned statically in the center of the workpiece, said target point being changed dynamically at the respective penetration point of the elongation of a torch axis and the workpiece when the welding torch approaches the workpiece. Thus, it is advantageous that in such a simulation it is not necessary to use 3D goggles, the disadvantage of which is that they have to be adjusted to possible weak eyesight of a user, but a system has been developed, in which each user can perform a welding simulation without great adjustments. Another advantage is that in using a welding shield as a visualization device the user can get accustomed to the use of the welding shield and can practice the weak visibility conditions of a welding helmet simultaneously.

The object of the invention is also solved by a method, wherein a defined section of the retaining device is designed as an input module having deposited functions, and the deposited functions are selected and activated by positioning the welding torch and preferably by activating a switching element on the welding torch. Thus, it is advantageous that by using the welding torch as a control element there is no need for the user to put the welding torch always down to enter certain inputs, increasing the system usability significantly.

Advantageously, the defined section is defined software-technically via the position on a box and is preferably indicated by a simple label on the box. Thus, the user can simply enter inputs or activate commands following a performed welding simulation with the welding torch.

When a non-contact selection of the defined section is performed via the welding torch by determining the welding torch position, the user only needs to move the welding torch near said section to select the section.

Measures are advantageous, in which by touching the defined section with a simulated welding wire a switching element coupled to the simulated welding wire is activated and the function deposited for this section is selected and activated, as hereby the user can activate appropriate functions by simply clicking this section.

Also measures are advantageous, in which the deposited function for the defined section is preferably selected for the start of the welding simulation or repetition of the welding simulation etc., as hereby the user can start the next welding simulation by activating said sections immediately.

The object of the invention is also solved by a method, wherein a recognition module for automatic recognition of the user's handedness of the welding torch is used for controlling the simulation of a welding process, wherein the position between a torch handle and a gas nozzle in relation to a workpiece arranged in the retaining device is determined and evaluated by the recognition module and depending on the user's handedness so determined appropriate regulations for the simulation of the welding process, particularly the illustration of the welding torch, is selected automatically.

The object of the invention is also solved by a method, wherein a control module for selecting and activating buttons illustrated on the output device by means of a welding torch, wherein in no simulation of the welding process the control of a pointer element is activated via the welding torch, and control of the pointer element, particularly a cursor, is performed by moving the welding torch in a certain section. Here it is advantageous that the complete control of software can be done via the welding torch, so that there is no need for the user to switch between the welding torch and an input device, such as keyboard or mouse, continuously.

However, a measure in which the control module is designed in the form of a mouse pad and on the mouse pad a transmitter for accurate position determination of the welding torch is arranged can also be advantageous, as thereby an accurate section for controlling the pointer element is defined and, thus, the position query for the welding torch for controlling the pointer element is facilitated significantly.

Furthermore, the object of the invention is also solved by a method, wherein a light source is arranged on a welding torch, particularly in the gas nozzle section, which, when activating a simulated welding process, is activated to simulate an electric arc of the welding process. It is advantageous that a simulation of the light arc is thereby enabled and hence a more real simulation of a welding process is achieved. Advantageously, by activating the light source the protective visor of a welding shield is darkened. Thus, the darkening of the welding shield is enabled like in a real welding process.

The present invention is explained in more detail with the help of the attached schematic drawings, in which.

Figure 1:
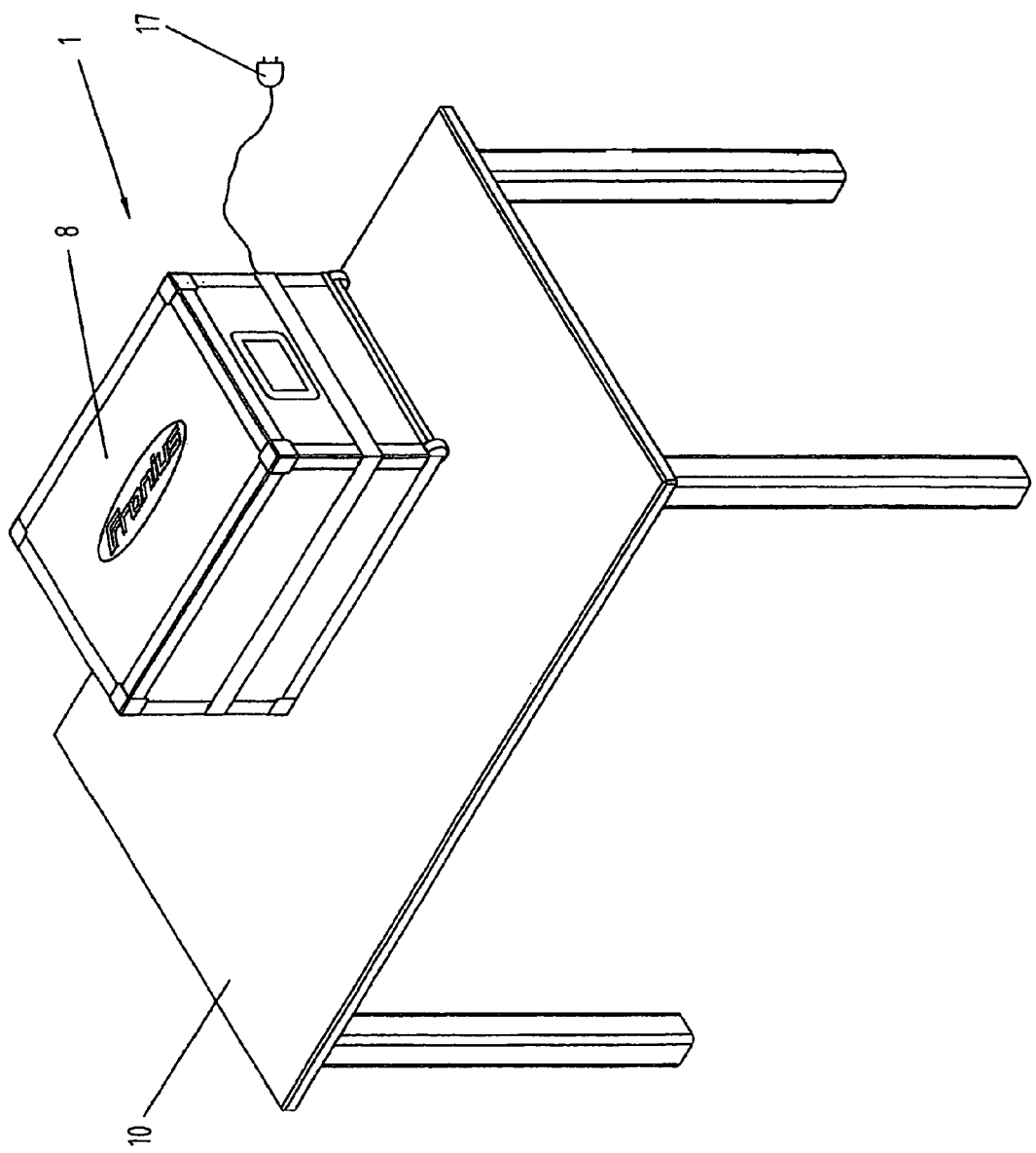
FIG. 1 shows an illustration of a device for simulating a welding process, arranged in a case.

In FIGS. 1 to 12 a device 1 for simulating a welding process is shown. Basically, it should be mentioned that in such a device 1 no real welding process is performed, but a welding process is simulated and displayed virtually with the help of a software running on a computer 2. The user is able to practice a welding process with the help of a commercially available welding torch 3, which had been reconstructed for said use, i.e. guiding the welding torch 3 in relation to a workpiece 4 can be practiced. Such simulation or practice systems offer the advantage that the user can practice a welding process as often as desired, without consuming respective additional material for the welding process and simultaneously without requiring workpieces or objects which afterwards would be discarded as scrap. Hence, a welder can for example be trained to a new welding process or the welding process can be more easily taught to new users in a simple way, before they perform welding on real workpieces or objects, respectively.

In said systems the position determination of individual components to each other in real time is significant. The position of welding torch 3 to workpiece 4 and the position of the user's eyes, i.e. the viewing angle, should preferably be detected, evaluated and displayed in real time. In the described embodiment a magnetic position monitoring device 5 is used, which is for example formed of a position/orientation tracker, such as a POLHEMUS tracker, an electromagnetic transmitter, such as a POLHEMUS transmitter and electromagnetic position sensors, such as POLHEMUS sensors of the prior art, over which positions, distances and speeds of the components are detected and are then converted from a software running on computer 2 into a virtual image associated with welding conditions, such as the light arc, the formed welding bead, etc., and are displayed either on a display device 6, particularly a commercially available monitor 7, or on 3D goggles.

Figure 2:
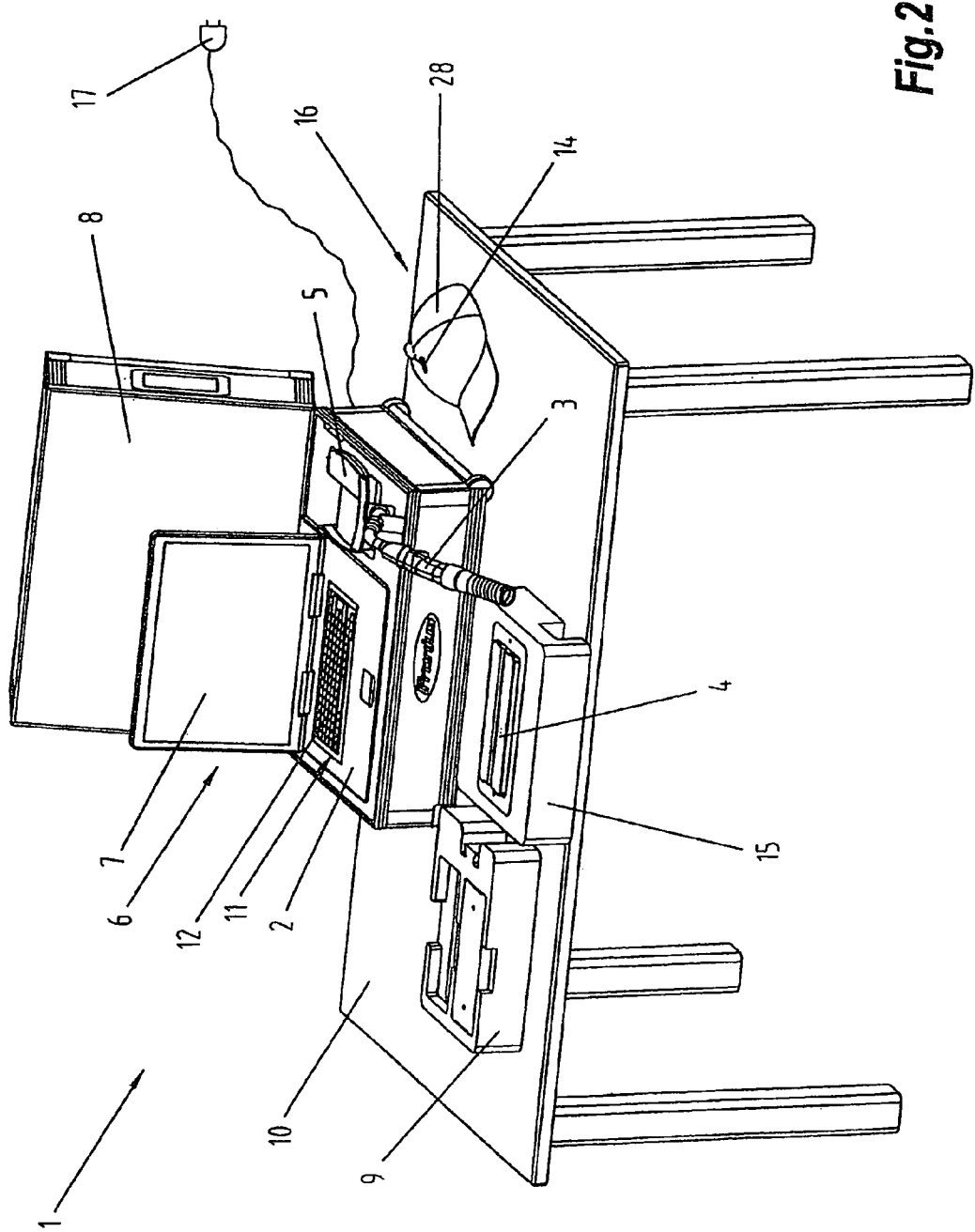
FIG. 2 shows the device for simulating a welding process in assembled condition.

According to the invention the system is compact, simple and portable, and can be handled, carried and assembled by a user easily without requiring special knowledge. Every required component can be integrated into a commercially available case 8, as can be seen in FIG. 1. As can be seen in FIG. 2, respective inlays 9 or elements, respectively, are arranged in case 8, in which the individual components are positioned. The components can be taken out, assembled and used by the user. The user can store all components in case 8 and can thus relocate, without requiring help of additional persons. The device 1 can space-savingly be assembled on a table 10 or a workplace. This enables that especially welders to be trained can take said case 8 home and perform appropriate welding exercises.

The individual components of device 1 for simulating a welding process consist of a computer 2 having an input device 11, particularly a keyboard 12 and/or a mouse, and an output device 6, a welding torch 3, a magnetic position monitoring device 5 having at least one transmitter 13 and a plurality of sensors 14, a retaining device 15 for a simulated workpiece 4 and a visualization device 16 or 3D goggles, respectively, for generating a two- or three-dimensional image on the output device 6.

For sake of clarity connection lines between the components are not shown. In order to achieve a simple assembly, the connector plugs for the connection lines are designed such, that there is always one pair of connector plugs existing, so that the user can not create any false connection when assembling the device.

Preferably the components are, however, already connected to each other, so that they only need to be taken out of case 8. The user only needs to establish a power supply to case 8, in order to supply the individual components with energy. For this purpose case 8 might be provided with a connector the user can connect a usual power cable 17 to. In case 8 a supply system (not shown) is arranged and connected to all components, so that they can be supplied with electric energy simultaneously. The user only needs to connect case 8 to a socket by means of a cable, in order to supply all components with energy.

Since electrically and magnetically conductive materials might cause interferences when using magnetic position monitoring devices, case 8 is preferably designed of an electrically and magnetically non-conductive material, such as a synthetic material. So, case 8 can be integrated in the assembly without causing interferences. For example case 8 can have guiding rails, retainers, etc., into which the individual components can be secured. For example it is possible to secure the retaining device 15 for workpiece 4 to case 8.

When assembling device 1 it is preferred to take out the retaining device 15 including the associated workpieces 4, the welding torch 3 and the visualization device 16 from case 8 and to place it on a working space or table 10, respectively, whereas the other components, like the computer 2 and the position monitoring device 5 preferably remain in case 8. The necessary connection lines (not shown) between components are already established, so that there is no need for the user to establish additional connections. The computer 2 is connected to the input device 11, particularly keyboard 12, and the output device 6, particularly monitor 7, is connected to the welding torch 3, the magnetic position monitoring device 5, onto which at least one transmitter 13 and a plurality of sensors 14 are connected, and the visualization device 16. The transmitter 13 is positioned on the retaining device 15, particularly inside the retaining device 15, for the workpiece 4 used for the simulation, and at least one sensor 14 is at least positioned on the visualization device 16 and the welding torch 3 at a time. In the described embodiment a single transmitter 13 and a plurality of sensors 14 are used, which are integrated in the individual components and are connected to the magnetic position monitoring device 5. With such a design, in which all components for a simulation device 1 or virtual welding device, respectively, can be stored in a portable case 8 and only the appropriate components need to be taken out of case 8 by the user when assembling the device, high usability is achieved, since there is no need for the user to establish any connection by cables.

For the simulation of a welding process a so-called simulated workpiece or workpiece 4 used for the simulation is required. There is no real welding process performed on said workpiece 4, but the workpiece 4 is only used as orientation for guiding the welding torch 3. Therefore, the retaining device 15 is provided, which in a simple form is placed on a working place or table 10, respectively, and into which the workpiece 4 can be inserted. The retaining device 15 is designed such, that it can be oriented depending on the type of welding to be practiced, i.e. horizontal or vertical welding. The retaining device 15 can simply be turned and, nevertheless, a position determination is possible without anew calibration, wherein an automatic recognition of the position due to the position of the welding torch 3 is performed, and the image on the display device 6 is correspondingly turned or displayed, respectively. Hence, two welding processes, namely a horizontal and a vertical welding process, can be practiced using one workpiece 4, by simply turning the retaining device 15, i.e. putting it on the end face, and by correspondingly tracing the workpiece 4 with the welding torch 3 by the user.

Figure 3:
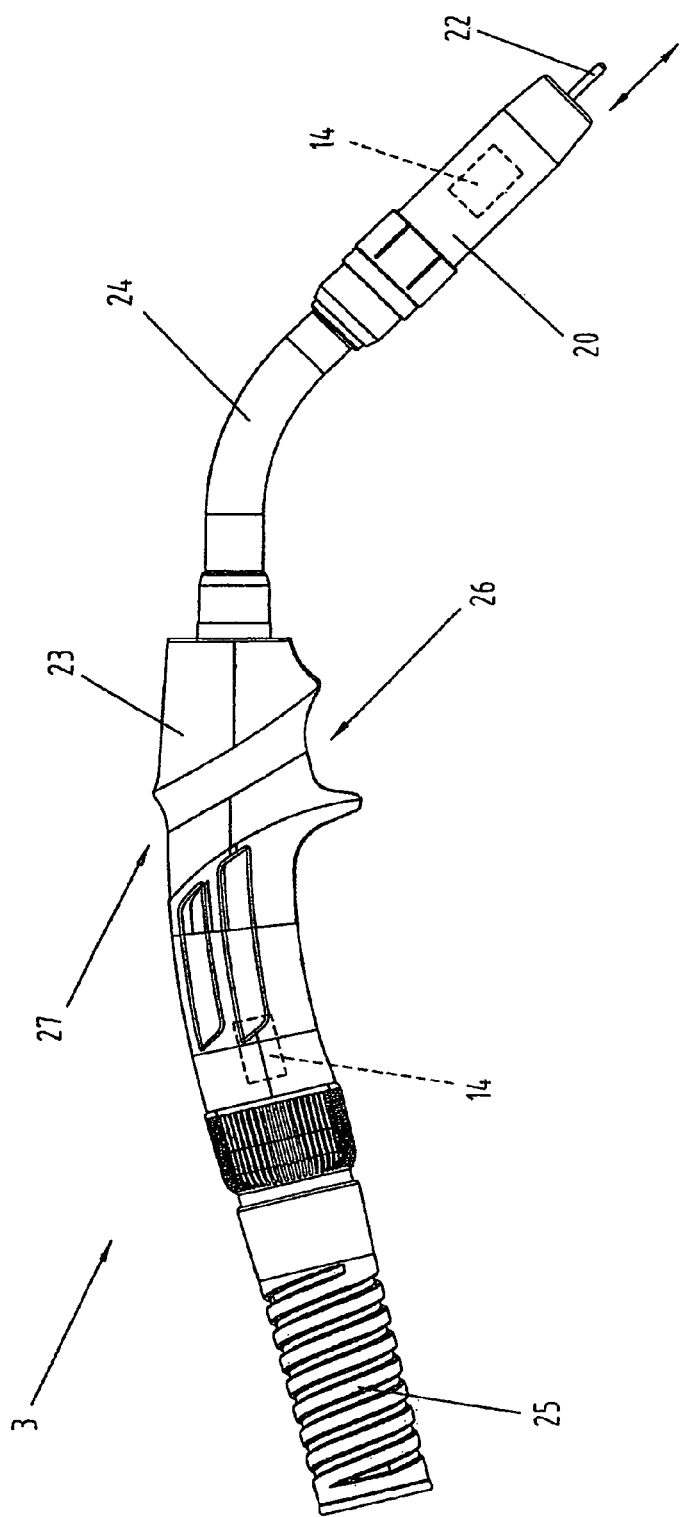
FIG. 3 shows a welding torch having built-in sensors for the simulation device, in a simplified schematic illustration.
Figure 4:
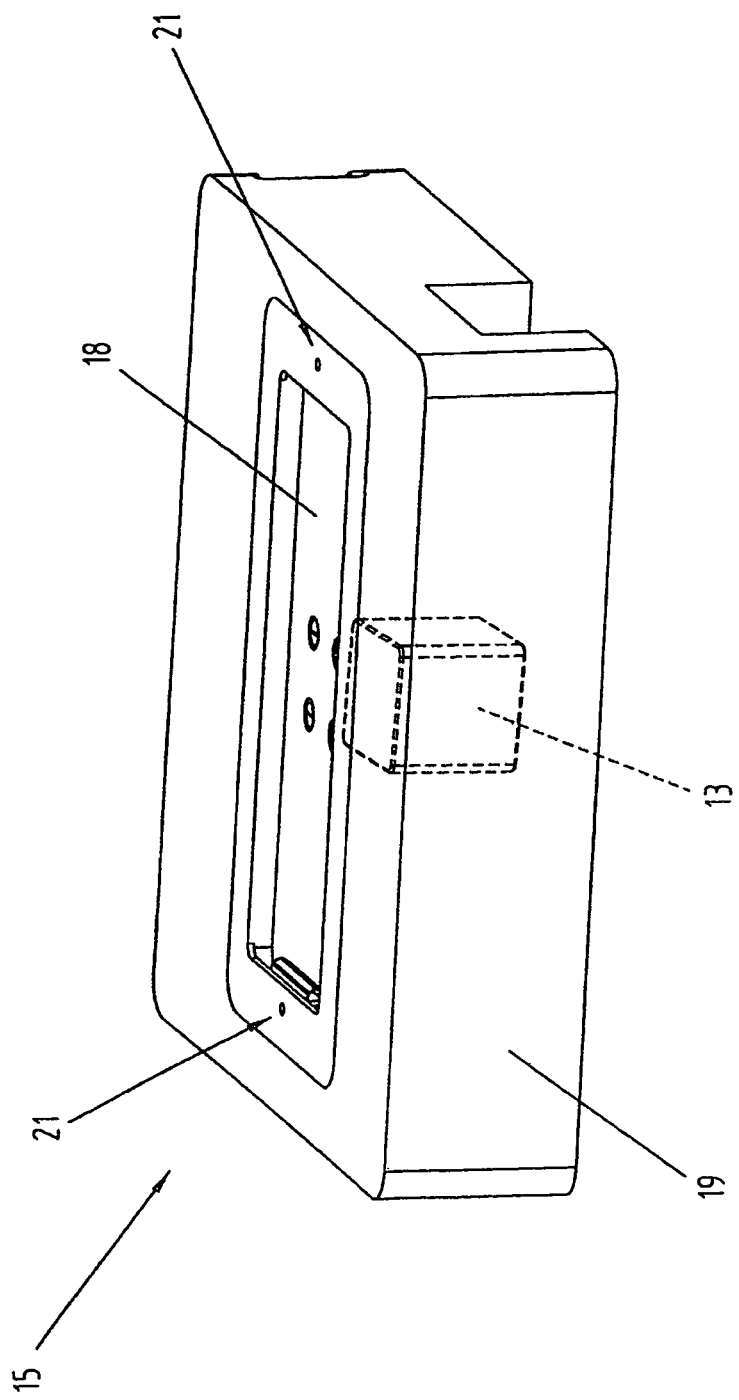
FIG. 4 shows a retaining device for inserting a workpiece for the simulation device, in a simplified schematic illustration.

In order to practice several different types of welding processes, different workpieces 4 can be inserted in the retaining device 15, that are shown in FIGS. 5 to 8. Therefore, the retaining device 15 comprises a recess 18, into which the most different workpieces 4 can be inserted. Below recess 18 of retaining device 15 the transmitter 13 of the position monitoring device 5 is arranged in a preferably small distance of the workpiece 4. Preferably the retaining device 15 is designed in the form of a small, portable box 19 to be placed on a table 10. The box 19 and the insertable workpiece 4 are in turn made of an electrically and magnetically non-conductive material, particularly synthetic material, so that no interferences will be caused by these components when determining position. It is important that due to the central position of the transmitter 13 within the retaining device 15 below workpiece 4 a minimal distance to sensor 14 within welding torch 3 in a simulated welding is given and, thus, a highly accurate position detection can be performed. Naturally, a transmitter 13 can be arranged on every workpiece 4 and said transmitter 13 can automatically be contacted and connected to the position monitoring device 5 when workpiece 4 is inserted in the box 19. When arranging the sensors 14 it is important that they are positioned as close to the transmitter 13 as possible. A sensor 14 within welding torch 3 is for example preferably positioned in a gas nozzle 20, as the gas nozzle 20 forms the end portion of the welding torch 3 and in a simulated welding process is brought very close to workpiece 4, as seen in FIG. 3. Hence, a very short distance between transmitter 13 below workpiece 4 or recess 18, and the sensor 14 within welding torch 3 brought close via the gas nozzle 20 is given, so that a highly accurate evaluation of the position of the welding torch 3 in relation to workpiece 4 is enabled. Furthermore, by the fixed arrangement of the transmitter 13 in the retaining device 15 below the workpiece 4 or the recess 18, respectively, it is achieved that there is no need for the user to perform a calibration. Naturally, it is intended that at least two calibration points 21 are marked on the retaining device 15, over which the user after starting the calibration software positions the welding torch 3, particularly by means of a pin 22 arranged on the welding torch 3, on said points and, thus, calibrates anew.

In order to give the user the feeling of a real or true welding, the welding torch 3 comprises a torch handle 23, a pipe bend and a hose pack 25. The welding torch 3 has the same dimensions and weight of a real welding torch and is connected to the computer 2 via a connection line, particularly the hose pack 25. This way the elements integrated into welding torch 3 can be used by the user like in a real welding torch. Preferably a start switch 26 for activating the simulated welding process is arranged at the torch handle 23. However, additional switching elements 27 for adjusting the given welding parameters, such as wire feed, voltage, power, etc. can still be arranged on the torch handle 23. In order to also determine the position of the welding torch 3 in relation to workpiece 4, the welding torch 3 is also connected to the positioning device 5, wherein the sensor 14 for position determination is arranged in the pipe bend 24, particularly in the section of the torch tip, i.e. the gas nozzle 20. Again it is important that the sensor is positioned as close to the torch tip as possible, so that the distance between transmitter 13 below workpiece 4 and the sensor 14 within welding torch 3 is as small as possible, so that measuring accuracy is increased and external interference influences are minimized. Between transmitter 13 and sensor 14 only workpiece 4 and the wall strength of the box 19 are arranged in the welding torch 3, whereby a very small distance between transmitter 13 and sensor 14 in the welding torch 3 is existing. Furthermore, another sensor 14 can be arranged in the torch handle 23, so that a complete position evaluation of the welding torch 3 is enabled.

An important detail of the design according to the invention is that the pin 22 for simulation of a welding wire is arranged on the torch tip, i.e. the gas nozzle 20, wherein the pin 22 is movably supported, as shown by an arrow. Usually in known designs a pin 22 is used that is fixedly integrated into the torch tip. Due to the movable support of pin 22 it is achieved that the user can bring the welding torch 3 close to the workpiece 4 until gas nozzle 20, wherein pin 22 is pushed into the welding torch 3, i.e. into the gas nozzle 20. Thus, it is achieved that the user is no more able to simply put down said pin 22 on the workpiece 4 and guide the welding torch 3 by means of the pin 22, since the pin 22 is pushed into welding torch 3 or displaced when the pin is put down on the workpiece 4. This way a particular realistic simulation is enabled, since the welding torch 3 can be brought still closer to the workpiece 4 than so far. The pin 22 protruding from the gas nozzle 20 can also be designed adjustable, as the length of the pin 22 protruding from the gas nozzle 20 is adjustable, whereby "stick-outs" of different lengths can be practiced. This can be done in a simple form such, that a small hand wheel is arranged on the gas nozzle 20, by means of which the length of the protruding pin 22 can be adjusted. Naturally, said adjustment can also be carried out automatedly, by having for example a small electric motor integrated into the gas nozzle 20, by means of which the length of the protruding pin 22 is adjusted. An automatic adjustment of the "stick-out" length is advantageous in that the user can carry out a "stick-out" length adjustment in the software, wherein afterwards an automatic adjustment is carried out.

For an optimum simulation it is, furthermore, important that the position of the eyes, particularly the corner of the user's eyes, in relation to workpiece 4 and welding torch 3 is determined, for which purpose visualization device 16 is used. In the assembly shown two different visualization devices 16 can be used, particularly 3D goggles (not shown) and a novel design comprising a welding shield or a cap 28.

The use of 3D goggles is not explained in more detail, since it is known from prior art. However, since 3D goggles have significant disadvantages, namely must be adjusted to possible weak eyesight of a user, the novel visualization device 16 has been developed, requiring no adjustment. To this end, to the position monitoring device 5 and/or the computer 2 the visualization device 16, particularly a welding shield or a cap 28, is connected, onto which a sensor is 14 arranged. The sensor 14 is preferably fixed to a bearer frame of the welding shield or to the highest point of the cap 28, so that the sensor 14 is preferably at the highest point when the user puts the shield on and thus the viewing angle of a user can be calculated. The user puts the welding shield or the cap 28 on the head and is thus able to perform control of the camera for visualizing the scene on the display device 6, particularly the monitor 7, by moving his head. Preferably the monitor 7 is positioned such that it is installed directly behind the workpiece 4 or the box 19, respectively, so that the user can look at the workpiece 4 and the image 29 displayed on the monitor 7 simultaneously, since in this embodiment of the visualization device 16 the user gets displayed the welding simulation on monitor 7 only. The position of the camera is determined by electromagnetic position sensor, such as a POLHEMUS sensor mounted on the welding helmet or the cap 28 and an electromagnetic transmitter, such as a POLHEMUS transmitter mounted in a workpiece 4, so that due to the movement of the user's head the position of the electromagnetic position sensor, such as the POLHEMUS sensor is determined and an appropriate angle in relation to workpiece 4 and welding torch 3 can be calculated, from which a corresponding image can be created on the monitor now.

Naturally, both a welding shield and also a cap 28 can be used, wherein the user can choose by means of which type of visualization device 16 he wants to carry out the welding simulation.

Figure 10:
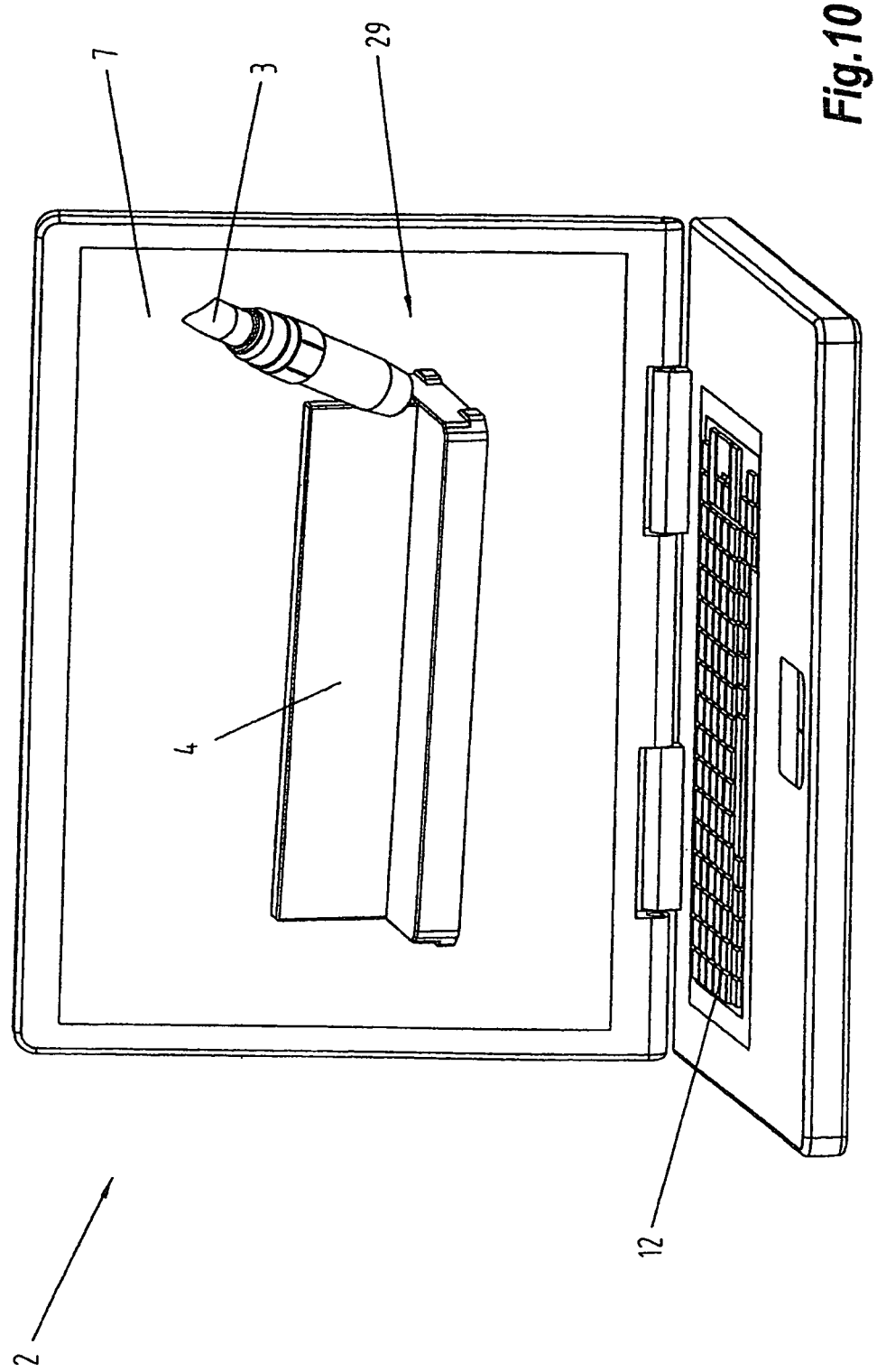
FIG. 10 shows an illustration of the display in the dynamic condition of the visualization device.

The visualization device 16 is also designed in the form of a welding shield or a cap 28, respectively, and a sensor 14 of the position monitoring device 5 is arranged on a bearer frame of the visualization device 16. In an embodiment according to the invention the visualization device 16 is used as a camera having a special damping for the movement of image 29, wherein at the beginning of the welding simulation a target point of the visualization device 16 is located statically in the center of the workpiece 4 displayed on monitor 7, and upon bringing the welding torch 3 close to the workpiece 4 the target point changes dynamically at the respective penetration point of the elongation of the torch axis and the workpiece 4, like schematically shown in FIGS. 9 and 10. In FIG. 10 it can also be seen that the user has moved the welding torch 3 to the workpiece, because in the displayed image the welding torch 3 is now only partly drawn in for sake of clarity and the viewing angle has dynamically changed. By means of such a visualization device 16 there is no virtual image created in all spatial directions like when using 3D goggles, but a significant image portion is steadily displayed on the monitor 7 only, namely the workpiece 4. In state of rest according to FIG. 9 only the section of workpiece 4 is displayed, regardless of the direction the user wearing the visualization device 16 is looking in. However, when the user moves the welding torch 3 into the display section, a virtual welding torch 3 becomes visible and the system is switched to a dynamic display screen, so that the position of sensor 14 in welding shield 3 and cap 28 is determined and a corresponding view of workpiece 4 is displayed for the determined position. When the user moves the welding torch 3 out of the display section again, than the position evaluation of sensor 14 in welding shield or cap 28, respectively, is sort of deactivated and switched to the static display screen. Thus, a simple mode has been provided, in which an adjustment to weak eyesight is not necessary, like with 3D goggles, and only the most important section is steadily displayed on monitor 7.

The process of a virtual welding will not be explained in more detail, because it corresponds to the usual software processes for simulations. On computer 2 an appropriate software is installed to determine, calculate respective processes and display appropriate displays of individual elements on monitor 7 or 3D goggles. It will only be mentioned shortly that after initial operation of device 1 the user is able to adjust different settings on the computer 2 and select the most different types of welding processes simultaneously. Furthermore, it is possible for the user to additionally choose, whether or not he wants to use auxiliary means, such as control arrows for the correct position of welding torch 3 for guiding the welding torch 3 along the workpiece 4. After the user has adjusted all settings and decided for a visualization device 16, the user can bring the welding torch 3 into a start position and then start the virtual welding process. To do so, the user operates the start switch 26 on welding torch 3 such, that the virtual light arc between workpiece 4 and welding torch 3 is ignited on monitor 7. Afterwards the user guides the welding torch 3 with or without auxiliary means, such as distance arrows, to the optimum position along the workpiece 4, wherein to the virtual image 29 an appropriate welding bead is formed on the monitor 7, which is calculated due to the guiding of the welding torch 3. When the user finished the welding process, in the solution according to the invention the carried out welding process is analyzed by computer 2 and via an integrated evaluation system respective points are awarded. Simultaneously it is of course possible to retrieve important records, such as short-circuits, etc., by the user independently.

Figure 11:
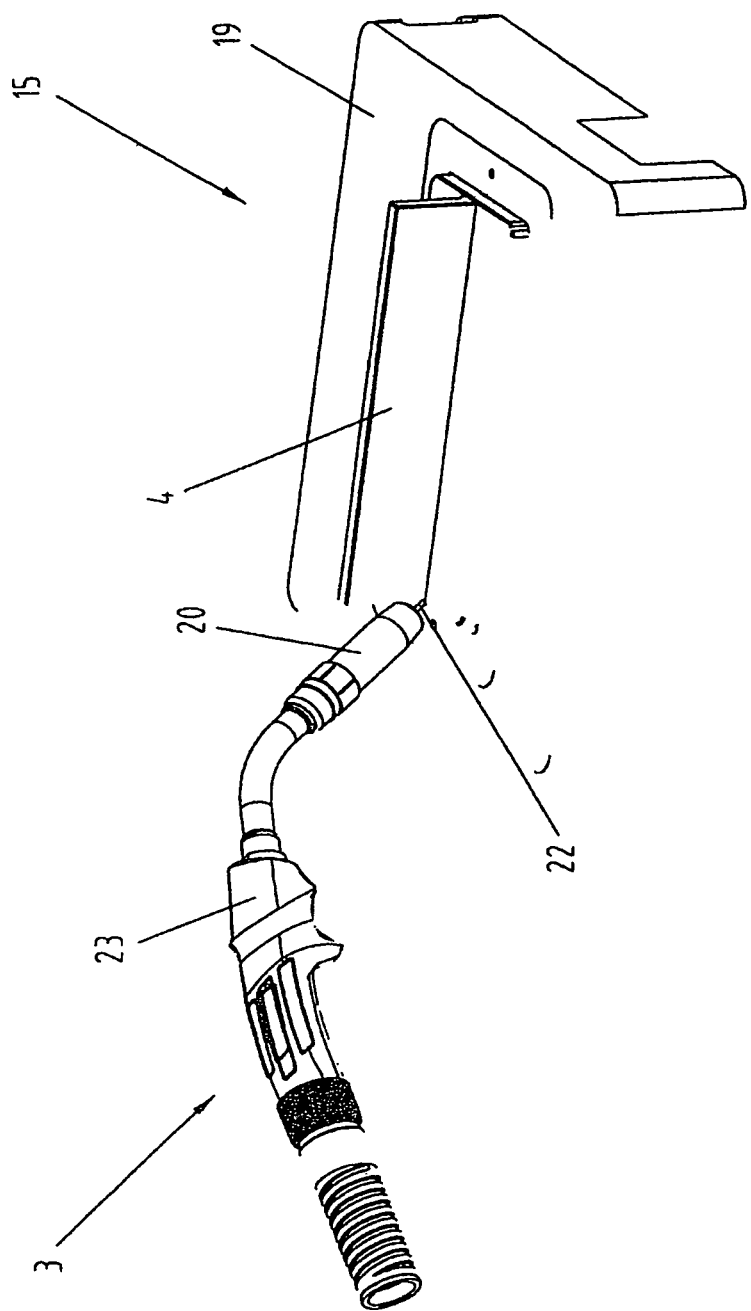
FIG. 11 shows an illustration for automatic recognition of the user's handedness by the example of a left-handed person using a workpiece to practice a fillet weld.
Figure 12:
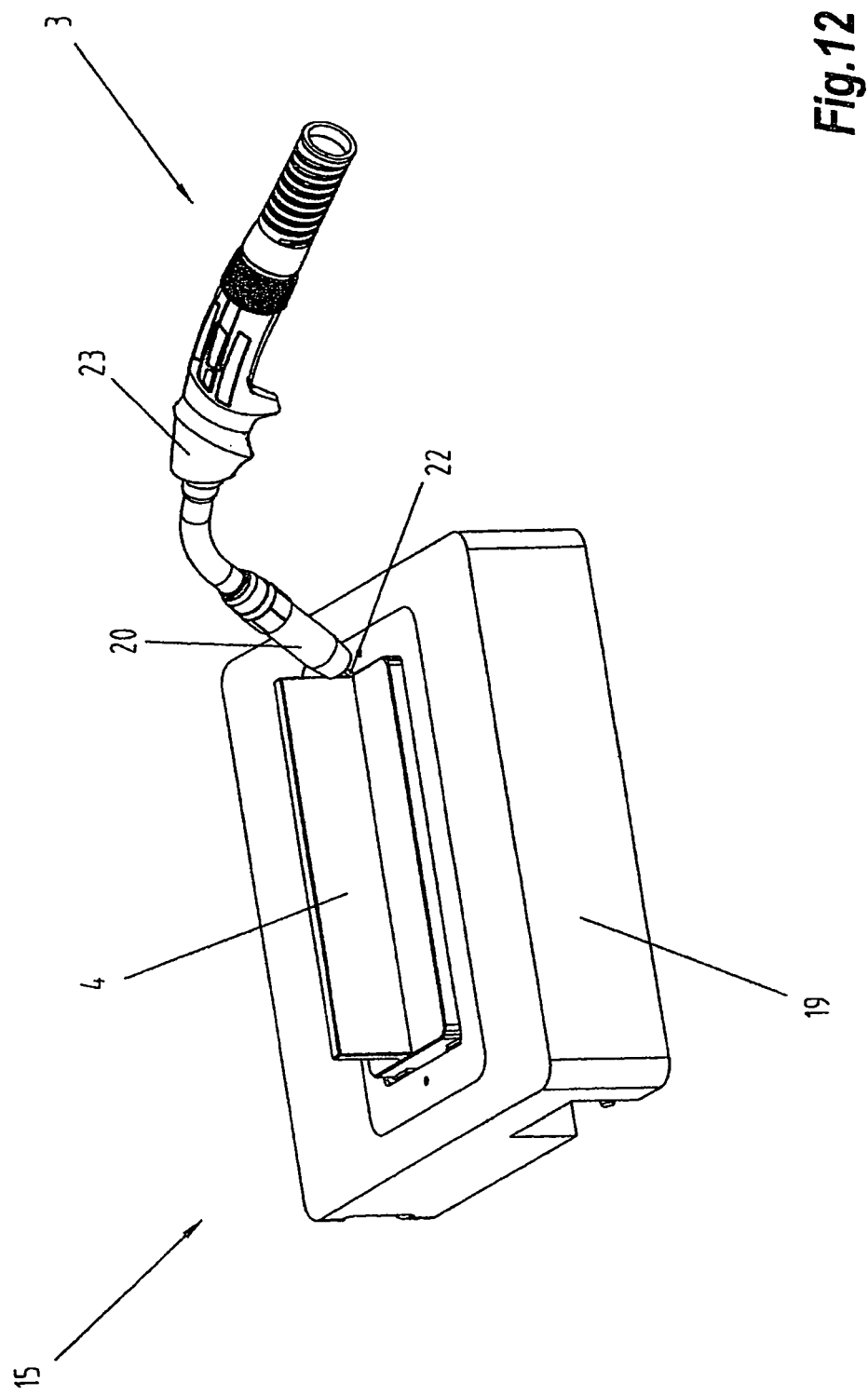
FIG. 12 shows an illustration for automatic recognition of the user's handedness by the example of a right-handed person using a workpiece to practice a fillet weld.
Figure 13:
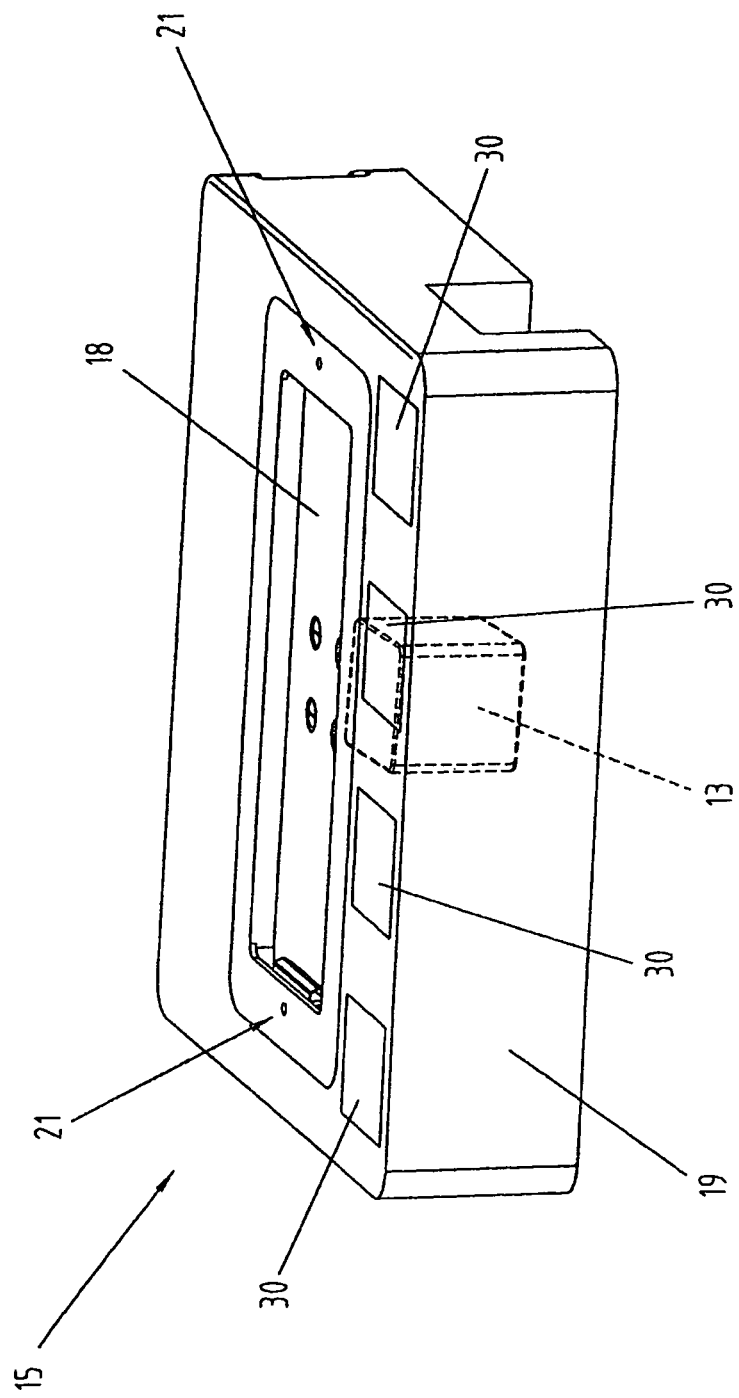
FIG. 13 shows a retaining device having marked, defined sections for selecting via the welding torch, in a simplified schematic illustration.

In order to design the application as convenient for the user as possible, a plurality of auxiliary modules according to the invention, such as for example the auxiliary module for an automatic recognition of user's handedness (left-handed/right-handed persons) described in the following, is software-technically integrated, as shown in FIGS. 11 and 12. A recognition module for automatic recognition of handedness of a user for handling the welding torch is used software-technically for controlling the simulation of the welding process. Said recognition module is integrated in the software on computer 2 and there is no need for the user to input any information or adjust settings related to his handedness. The position between torch handle 23 and gas nozzle 20 in relation to workpiece 4 arranged in the retaining device 15 is determined and evaluated by the recognition module and the appropriate software for the simulation of the welding process, particularly the display of image 29 from the welding torch 3, is selected automatically. In order to employ such a recognition module it is necessary to have at least two sensors 14 arranged in the welding torch 3, wherein preferably one sensor 14 is built-in in the gas nozzle 20 and one sensor 14 is built-in in the torch handle 23, as seen in FIG. 3. Hence, it is possible that the position of both sensors 14 to each other and in relation to the transmitter 13 can be determined, and depending on the position of torch handle 23 on the left- or right-hand side of sensor 14 in the gas nozzle 20 it can be determined in which hand the user holds the welding torch 3. When for example the sensor 14 in the torch handle 23 is arranged on the left-hand side of sensor 14 in the gas nozzle 20 in relation to workpiece 4, the user holds the welding torch 3 with the left hand, as shown in FIG. 11, and the software activates the display on monitor 7 for a left-handed person. On the other hand, when the sensor 14 in torch handle 23 is arranged on the right-hand side of sensor 14 in the gas nozzle 20 and in relation to workpiece 4, the welding torch 3 is held with the right hand, as shown in FIG. 12, and the software selects the display of welding torch 3 on monitor 7 for right-handed persons.

Furthermore, an auxiliary module for improving input-friendliness is arranged, in which the welding torch 3 is additionally used as an input means now. Therefore, at least one defined section 30 of the retaining device 15 is designed as an input module with deposited functions, so that by positioning the welding torch 3 and activating the start switch 26 on welding torch 3 the deposited functions for this section 30 can be selected and activated. Hence, there is no need for the user to put the welding torch 3 down for certain commands, but can enter appropriate inputs directly by means of the welding torch 3. In doing so the defined section 30 is software-technically defined via the position on box 19 or the retaining device 15, respectively, and is preferably marked by a simple label on the retaining device 15. Thus, the user can position the welding torch 3 to this section 30 or the given position, respectively, and can then retrieve and execute the function deposited behind this position by operating the start switch 26 arranged on the welding torch 3. Naturally, a pointer element (not shown) displayed on monitor 7 can be also moved into an appropriate position on monitor 7 by tracing these positions or sections 30, respectively, on the retaining device 15. Hence, it is also possible that the same function can be invoked either by means of an appropriate input device, such as a mouse, by means of a mouse or the welding torch 3. By using the welding torch 3 a non-contact selection of section 30 or the position, respectively, can be performed by simply determining the position of the welding torch 3. By touching the defined section 30, i.e. the label, even with the simulated welding wire, i.e. the pin 22, a switching element connected to pin 22 can be activated by pushing the pin 22 into, and the function deposited for this section 30 can be selected and activated. Thus, there is no need for the user to operate the start switch 26 or another switching element 27, but only to push the tip of the welding torch 3 onto the respective section 30. In order to activate several possibilities, i.e. for example contacting with pin 22 or operating the switching element 27 or the start switch 26 on the torch handle 23 or a mouse connected to computer 2, can be operated in parallel.

Therefore, on box 19 certain defined sections 30 are arranged for an input via welding torch 3, thereby achieving that there is no need for the user to put down welding torch 3 to invoke certain functions or commands, respectively, increasing the usability significantly. A deposited function for a section 30 could for example be the start of the welding simulation, the repetition of welding simulation or the end of the welding simulation, etc. For example the sections 30 can also be designed for a confirmation button, a repetition button, a menu button, a reverse button, so that with appropriate positioning and activation of welding torch 3 the appropriate command can be executed on computer 2.

Additionally, a control module for selecting software-technically displayed buttons on the output device 6 can be used, wherein in a simulation of the welding process said control module is activated, and the control of a pointer element, particularly a cursor, is performed by moving the welding torch 3 into a certain section or area. The control of the pointer element on monitor 7, usually done by means of a mouse can now be performed via the welding torch 3, so that there is no need for the user to change between mouse and welding torch 3 continuously. The user can perform all functions of a mouse also with the welding torch 3. To this end an appropriate mouse pad can be used, onto which another transmitter 13 is positioned. When the user guides the welding torch 3 onto the mouse pad, this will be recognized by the additional transmitter 13 and the position of the welding torch 3 at the mouse pad is evaluated by said transmitter. The use of such a mouse pad is advantageous in that extensive position determinations are not necessary, but are limited to a certain size of the mouse pad, and thus a guidance of the pointer element is easily possible. It is important that the software automatically recognizes, whether a control of the pointer element or a welding process is performed. This can be done in such an easy manner that certain start positions are defined on the retaining device 15 on workpiece 4, so that by bringing the welding torch 3 close to these start positions and by activating the start switch 26 on the welding torch 3 a simulation is started, whereas a control of the pointer element is performed when the welding torch 3 is located outside a given distance to the start position. Also automatic recognition can be done such, that always the position that is nearer to the respective transmitter 13 on the retaining device 15 or the mouse pad is evaluated.

Figure 5:
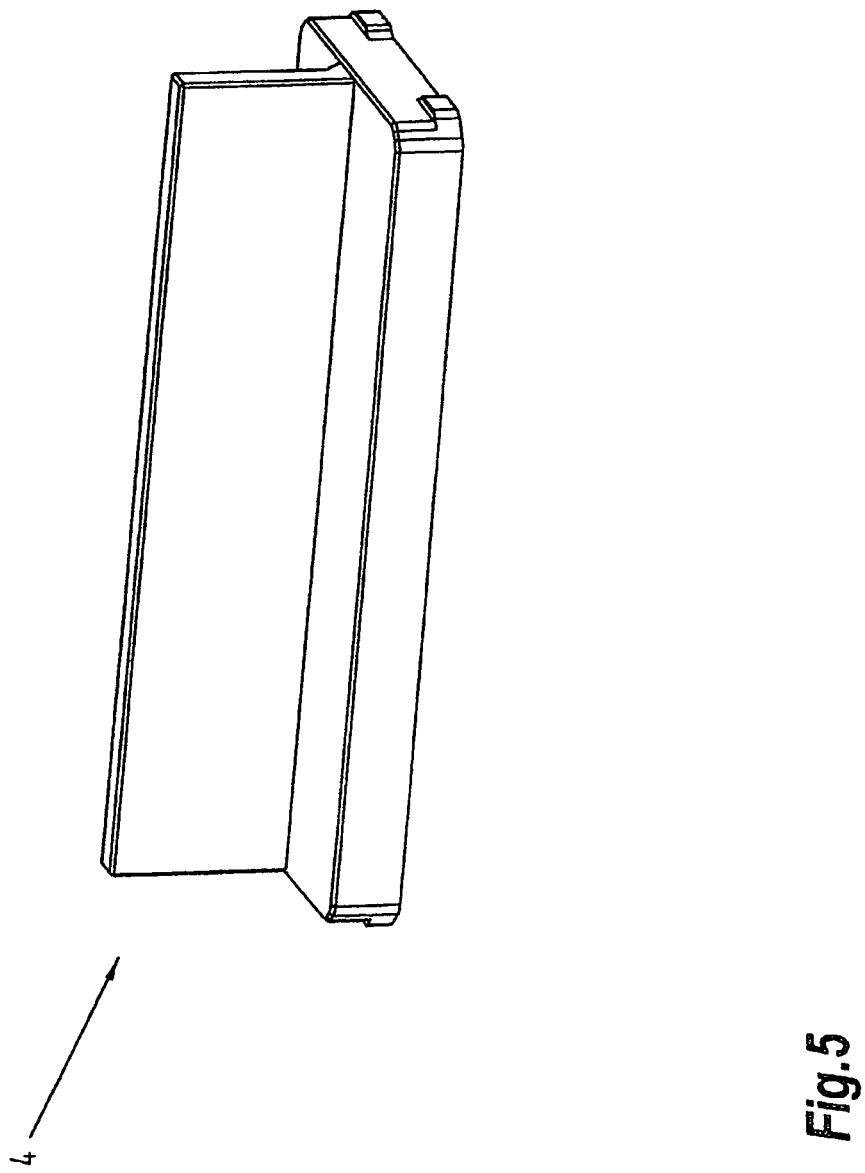
FIG. 5 shows a workpiece for inserting into the retaining device for the simulation device to practice a fillet weld, in a simplified schematic illustration.
Figure 6:
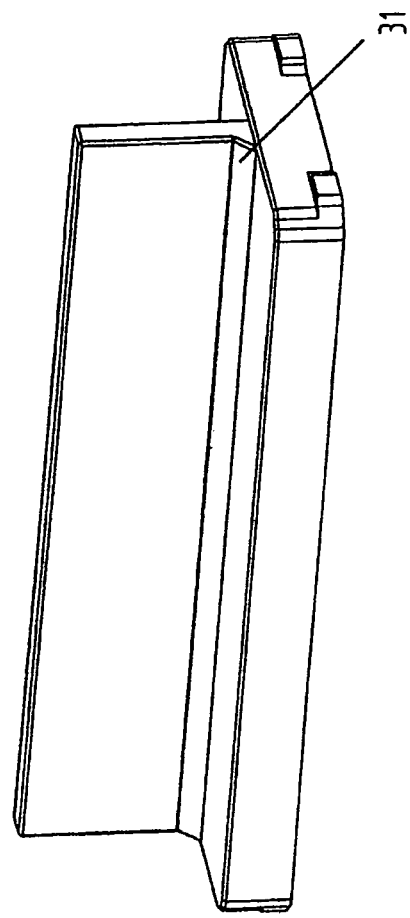
FIG. 6 shows another workpiece to practice a fillet weld, provided with a first welding bead.
Figure 7:
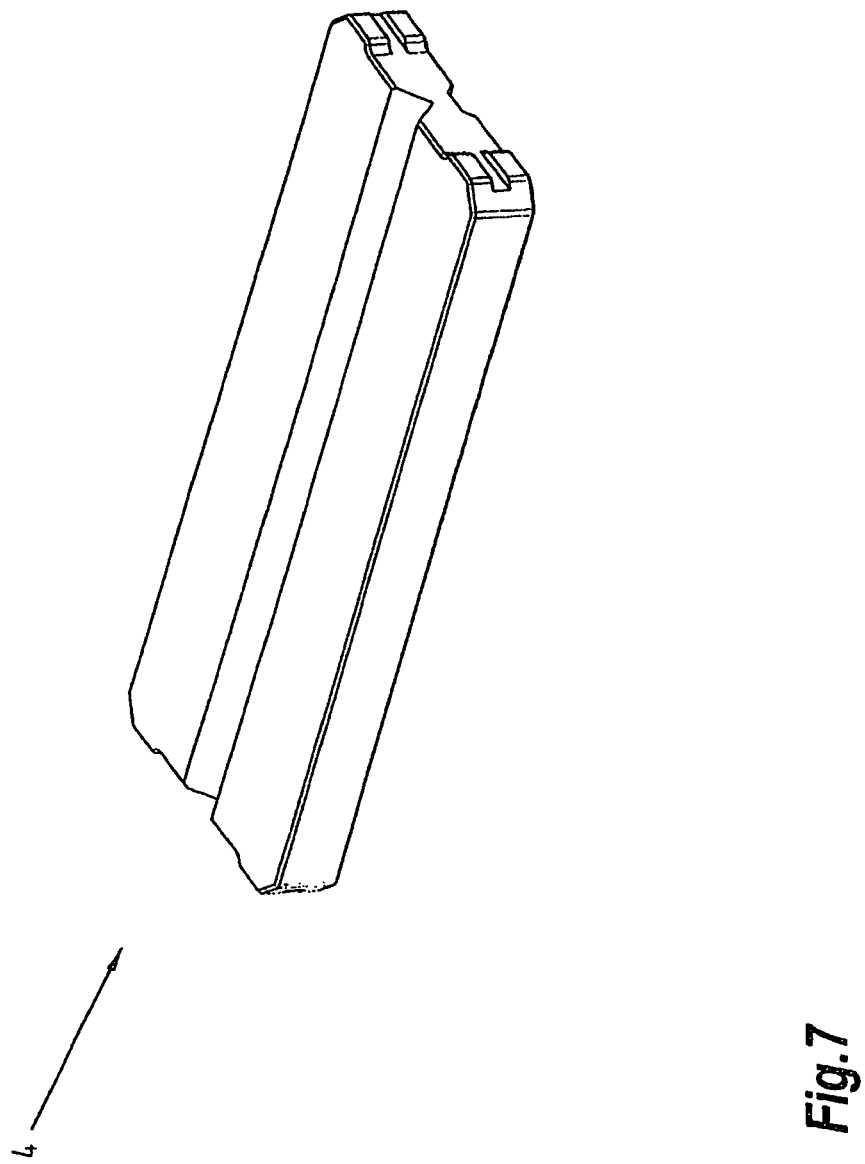
FIG. 7 shows another workpiece for inserting into the retaining device to practice a butt weld, in a simplified schematic illustration.
Figure 8:
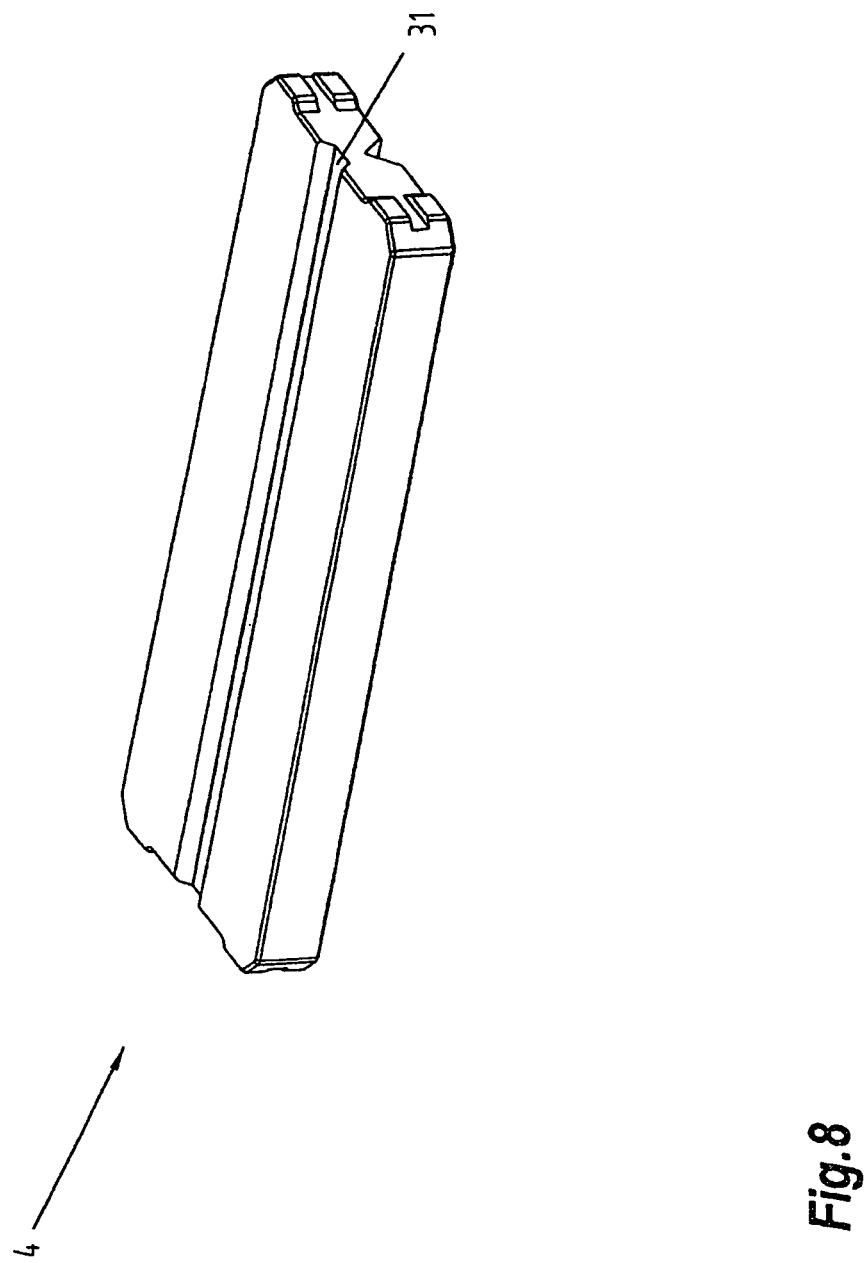
FIG. 8 shows the workpiece according to FIG. 7 in reverse position, provided with a first welding bead.
Figure 9:
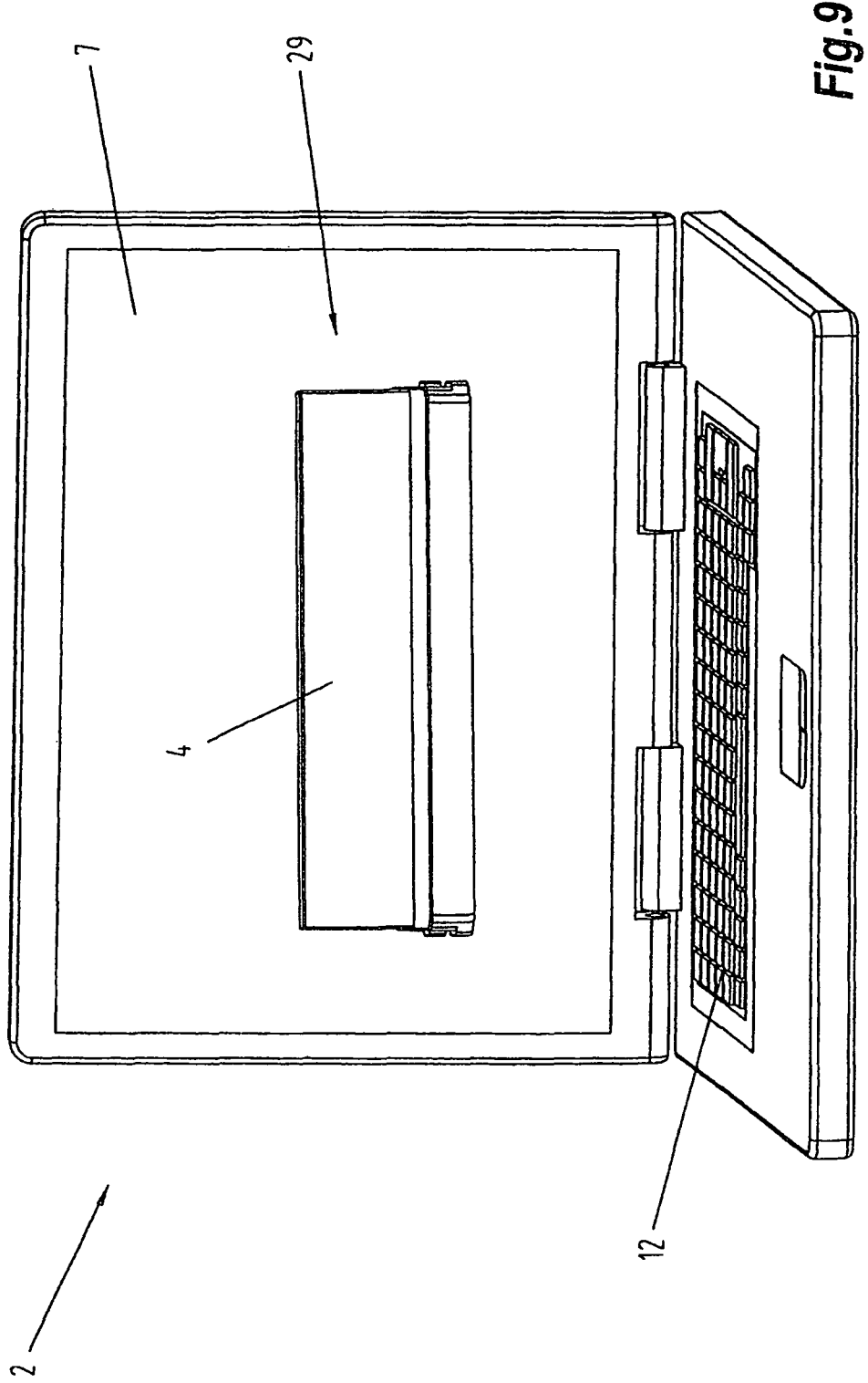
FIG. 9 shows an illustration of the display in the static condition of the visualization device.

In FIGS. 6 and 8 an embodiment for the simulation of a built-up welding in a fillet weld or a butt weld, respectively, is shown. Basically, built-up welding consists of arranging several layers of welding beads above each other. To this end, it is intended that the first welding bead 31 is simulated or designed directly on the workpiece 4 to be inserted. That means that a workpiece 4 having a fillet weld or a butt weld without welding bead 31 included therein, as shown in FIGS. 5 and 7, is existing, which the user inserts at first for the first welding and then following the first welding, replaces the workpiece 4 by a workpiece 4 having a displayed, simulated welding bead 31, according to FIGS. 6 and 8, and thus can perform further weldings. In the embodiment shown the user only needs to turn the workpiece 4 and to reinsert it into the retaining device 15, since both designs are realized in one workpiece 4.

Figure 14:
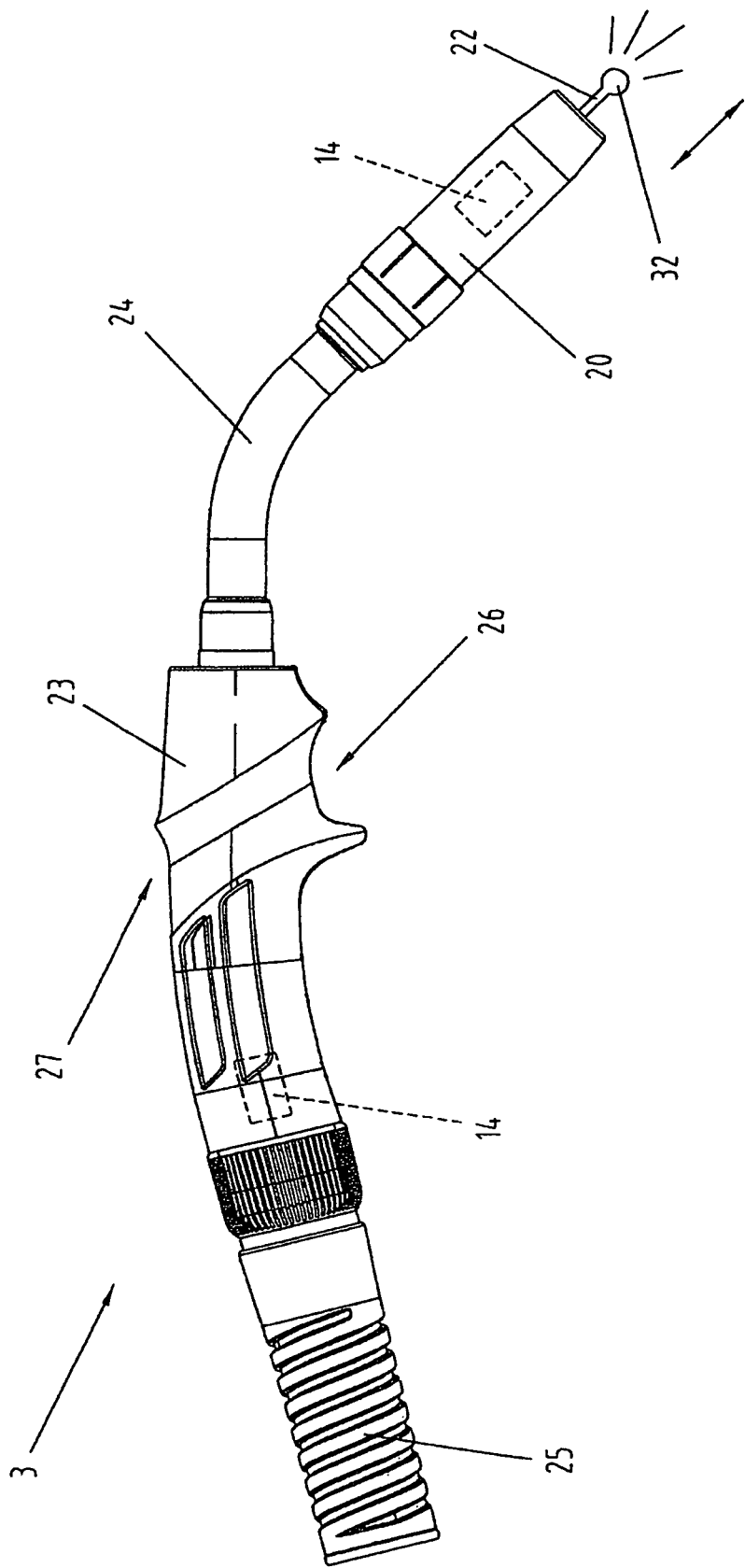
FIG. 14 shows a welding torch having a built-in light source for simulating a light arc, in a simplified schematic illustration.

In FIG. 14 an embodiment of a welding torch 3 is shown, in which a light source 32 is arranged on pin 22 or instead of pin 22. The object of said light source 32 is to simulate the very bright light arc of a real welding, during performance of a welding simulation the light source is activated and simultaneously the light arc on the display device 6 is ignited at the start of the simulation. Preferably a stroboscope light source 32 is employed. By simulating the light arc on welding torch 3 via light source 32 also the darkening of a protective visor on the welding helmet can be simulated or used, wherein during the use of a welding shield as a visualization device 16 the darkening shield arranged on the welding shield is darkened by applying a voltage. This should be carried out synchronously with activation of light source 32. Naturally, in an automatic darkening welding shield and correspondingly bright light source this can be carried out automatically and a control by computer 2 is not necessary. Using a light source 32 for simulating the light arc a more realistic simulation of a welding process is achieved, since the user should use a welding helmet and thus also weak viewing conditions during welding can be practiced.

Case 8 can also have an external interface (not shown), over which the case 8 can be connected to a real welding apparatus. The external interface is connected to computer 2, so that data from the welding apparatus can be transmitted to computer 2. Hence, the user can for example download data from a welding apparatus in use and afterwards practice with those settings at home or in the office. Thus, simulations with real settings used become possible, which can be transferred in an easy way. When the computer 2 arranged in case 8 is embodied as a laptop or the computer has an internal power supply for example by batteries, then it is possible that by activating the external interface on case 8 the computer 2 starts and boots automatically. Afterwards computer 2 automatically performs a data transfer, so that necessary data are downloaded from the connected welding apparatus. The user only needs to go to the welding apparatus with case 8, connect case 8 to the welding apparatus via the external interface, whereupon the respective data will be transferred automatically.

Of course, data can also be transferred from computer 2 in case 8 to welding apparatus. This takes places when at first appropriate welding attempts are performed over the welding simulation, which will then be stored and transferred to a welding apparatus.

Another possibility to improve the user-friendliness is achieved in that workpieces 4 and box 19 are equipped with an automatic recognition means, particularly a RFID chip and a RFID reader. This way an automatic recognition of the used workpiece 4 is enabled, whereby an appropriate setting on computer 2 is done automatically. Thus the user friendliness of the system is significantly increased and error sources in settings can be minimized.

The invention claimed is:

1. A device for simulating a welding process by a user, comprising a computer having an input device and an output device, a welding torch, a magnetic position monitoring device having at least one transmitter and a plurality of sensors, a retaining device for a workpiece used for the simulation and a visualization device for generating a two- or three-dimensional image on the output device,
  wherein the retaining device is designed in the form of a small, portable box to be placed on a table and has a recess into which various workpieces can be inserted, the at least one transmitter of the position monitoring device being arranged below the recess at as small a distance from the workpiece as possible,
  wherein at least one sensor of the plurality of sensors of the position monitoring device is arranged on a welding shield or a cap for the user as the visualization device, so that depending on the user's position in relation to the workpiece and an angle to the workpiece determined from that and the welding torch the viewing angle of image on the display device can be changed dynamically, and
  wherein the welding torch comprises a torch handle and a pipe bend and has a line connection to the computer.

2. The device according to claim 1, wherein the box and the workpiece are made of an electrically and magnetically non-conductive material, particularly a synthetic material.

3. The device according to claim 1, wherein the at least one transmitter is arranged on a central position of retaining device below workpiece, so that in a simulated welding process the distance of the at least one transmitter to a sensor in the welding torch can be minimized.

4. The device according to claim 1, wherein the box is designed with the workpiece for the simulation of both a horizontal and a vertical welding.

5. The device according to claim 1, wherein the workpiece and the box are equipped with an automatic recognition device, particularly a RFID chip and a RFID reader.

6. The device according to claim 1, wherein marked sections for an input via welding torch are arranged on box.

7. The device according to claim 6, wherein the sections are designed as confirmation button, repetition button, menu button, reverse button, so that with appropriate positioning and activation of the welding torch the appropriate command can be executed on the computer.

8. The device according to claim 1, wherein in the pipe bend particularly in the section of a torch tip, a sensor for position monitoring is arranged.

9. The device according to claim 1, wherein on the welding torch particularly on the torch tip, a movably supported pin for simulating a welding wire is arranged.

10. The device according to claim 1, wherein a start switch for activating the simulation of the welding process is arranged on the torch handle.

11. The device according to claim 1, wherein additional switching elements for adjusting welding parameters, such as wire feed, voltage, power, that can be predefined, are arranged on the torch handle.

12. The device according to claim 1, wherein the at least one sensor on welding helmet or cap is formed by an electromagnetic position sensor and the at least one transmitter on box is formed by an electromagnetic transmitter.

13. The device according to claim 1, wherein a case for storing all components is provided.

14. A method for generating a two-dimensional image on an output device via a visualization device for the simulation of a welding process by a user, in which a computer with an input device and an output device is connected to a position monitoring device having at least one transmitter and a plurality of sensors and is connected to a welding torch, and by meaner via the welding torch a welding process is simulated on a simulated workpiece arranged in a retaining device, in which the position of the welding torch in relation to the workpiece and the position of the user, particularly the user's eyes, are detected via the visualization device and are converted into an image generated on the output device by the computer,
  wherein the visualization device is designed in the form of a welding shield or a cap,
  wherein a sensor of the plurality of sensors of the position monitoring device is arranged on the visualization device,
  wherein the visualization device is employed as a camera having a special damping for movement, and
  wherein at the start of the welding simulation a target point of the visualization device is located statically in the center of the workpiece, said target point being changed dynamically at the respective penetration point of the elongation of a torch axis and the workpiece when the welding torch approaches the workpiece.

15. A method for controlling a simulated welding process by a user, in which a computer with an input device and an output device is connected to a welding torch and to a magnetic position monitoring device, to which at least one transmitter and a plurality of sensors are connected,
  wherein the transmitter is positioned on the retaining device for a simulated workpiece and at least one sensor is positioned on a visualization device and the welding torch at a time,
  wherein at least one defined section of the retaining device designed as a small, portable box to be placed on a table is designed as an input module having deposited functions, and
  wherein by positioning the welding torch and by determining the position of the welding torch via a sensor of the plurality of sensors and the at least one transmitter in the box the deposited functions are selected and activated.

16. The method according to claim 15, wherein at least the defined section is software-technically defined via the position on the box and is preferably indicated by a simple label on the box.

17. The method according to claim 15, wherein by contacting the defined section with a pin for simulating a welding wire a switching element coupled to pin is activated and the function deposited for this defined section is selected and activated.

18. The method according to claim 17, wherein the deposited function for the defined section is preferably selected for the start of the welding simulation or repetition of welding simulation, respectively.

19. A method for controlling a simulated welding process by a user, in which a computer with an input device and an output device for displaying a two- or three-dimensional image is connected to a welding torch and to a magnetic position monitoring device, to which at least one transmitter and a plurality of sensors are connected, the welding torch comprising a torch handle and a pipe bend and having a line connection to the computer,
- wherein the at least one transmitter is positioned on a retaining device for a simulated workpiece and at least one sensor of the plurality of sensors is positioned on a visualization device and the welding torch at a time,
- wherein a recognition module for automatic recognition of the user's handedness of the welding torch is employed for controlling the simulation of a welding process, and
- wherein the position between a torch handle and a gas nozzle of the welding torch in relation to the workpiece arranged in the retaining device designed as a small, portable box to be placed on a table is determined and evaluated, and depending on the determined handedness of the user corresponding regulations for the simulation of the welding process and the display of the welding torch in image on the display device are automatically selected.

20. A method for controlling a simulated welding process by a user, in which a computer with an input device and an output device for displaying a two- or three-dimensional image is connected to a welding torch and to a magnetic position monitoring device, to which at least one transmitter and a plurality of sensors are connected,
- wherein the at least one transmitter is positioned on a retaining device for a simulated workpiece and at least one sensor of the plurality of sensors is positioned on a visualization device and the welding torch at a time,
- wherein a control module for selecting and activating of buttons displayed on the output device is performed over a welding torch,
- wherein in no simulation of a welding process the control of a pointer element displayed on the output device is activated over the welding torch, and
- wherein controlling the pointer element, particularly a cursor, is carried out by moving the welding torch in a section of a mouse pad equipped with a transmitter for accurate position determination of the welding torch.

21. A method for controlling a simulated welding process by a user, in which a computer with an input device and an output device for displaying a two- or three-dimensional image is connected to a welding torch and to a magnetic position monitoring device, to which at least one transmitter and a plurality of sensors are connected,
- wherein the at least one transmitter is positioned on the retaining device for a simulated workpiece and at least one sensor of the plurality of sensors is positioned on a visualization device and the welding torch at a time,
- wherein on a welding torch, particularly in the section of a gas nozzle, a light source is arranged, which is activated when a simulated welding process is activated, in order to simulate a light arc of the welding process, and
- wherein when activating the light source a protective visor of a welding shield as visualization device for the user is darkened.

22. The method according to claim 14, using a device for simulating a welding process by a user, the device comprising the computer having the input device and the output device, the welding torch, and the position monitoring device comprising a magnetic position monitoring device having the at least one transmitter and the plurality of sensors, the retaining device for the workpiece used for the simulation and the visualization device for generating a two- or three-dimensional image on the output device,
- wherein the retaining device is designed in the form of a small, portable box to be placed on a table and has a recess into which various workpieces can be inserted, the at least one transmitter of the magnetic position monitoring device being arranged below the recess at as small a distance from the workpiece as possible, and
- wherein the at least one sensor of the magnetic position monitoring device is arranged on the welding shield or the cap for the user as the visualization device, so that depending on the user's position in relation to the workpiece and an angle to the workpiece determined from that and the welding torch the viewing angle of image on the display device can be changed dynamically.

* * * * *

UNITED STATES PATENT AND TRADEMARK OFFICE
CERTIFICATE OF CORRECTION

| | | |
|---|---|---|
| PATENT NO. | : 8,777,629 B2 | |
| APPLICATION NO. | : 12/737313 | |
| DATED | : July 15, 2014 | |
| INVENTOR(S) | : Kreindl et al. | |

It is certified that error appears in the above-identified patent and that said Letters Patent is hereby corrected as shown below:

In the Claims:

Column 14, lines 16-17 (lines 6-7 of Claim 14), after the word "and" (second occurrence) please delete: "by meaner".

Signed and Sealed this
Sixteenth Day of September, 2014

Michelle K. Lee
*Deputy Director of the United States Patent and Trademark Office*